US008341237B2

(12) United States Patent
Benhase et al.

(10) Patent No.: US 8,341,237 B2
(45) Date of Patent: Dec. 25, 2012

(54) SYSTEMS, METHODS AND COMPUTER PROGRAM PRODUCTS FOR AUTOMATICALLY TRIGGERING OPERATIONS ON A QUEUE PAIR

(75) Inventors: Michael T. Benhase, Tucson, AZ (US); David Craddock, New Paltz, NY (US); Thomas A. Gregg, Highland, NY (US); William G. Verdoorn, Jr., Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1515 days.

(21) Appl. No.: 11/551,989

(22) Filed: Oct. 23, 2006

(65) Prior Publication Data

US 2008/0147822 A1    Jun. 19, 2008

(51) Int. Cl.
*G06F 15/167* (2006.01)
*G06F 15/16* (2006.01)
*G06F 13/28* (2006.01)

(52) U.S. Cl. ............ 709/212; 709/250; 710/22

(58) Field of Classification Search ........... 709/212, 709/226, 250; 370/241, 392; 379/45; 702/124; 707/2; 710/263, 260; 719/313
See application file for complete search history.

(56) References Cited

U.S. PATENT DOCUMENTS

| | | | |
|---|---|---|---|
| 5,933,825 A | 8/1999 | McClaughry et al. | |
| 6,026,412 A | 2/2000 | Sockut et al. | |
| 6,374,236 B1 * | 4/2002 | Chen et al. | 707/2 |
| 6,643,355 B1 * | 11/2003 | Tsumpes | 379/45 |
| 6,990,424 B2 * | 1/2006 | Clegg et al. | 702/124 |
| 7,103,888 B1 * | 9/2006 | Cayton et al. | 719/313 |
| 2001/0049755 A1 | 12/2001 | Kagan et al. | |
| 2002/0091826 A1 * | 7/2002 | Comeau et al. | 709/226 |
| 2002/0152327 A1 * | 10/2002 | Kagan et al. | 709/250 |
| 2002/0156942 A1 | 10/2002 | Tyndall | |
| 2002/0165899 A1 | 11/2002 | Kagan et al. | |
| 2003/0043805 A1 * | 3/2003 | Graham et al. | 370/392 |
| 2004/0049580 A1 * | 3/2004 | Boyd et al. | 709/226 |
| 2004/0093389 A1 * | 5/2004 | Mohamed et al. | 709/212 |
| 2004/0136325 A1 * | 7/2004 | Dobric et al. | 370/241 |
| 2005/0149554 A1 | 7/2005 | Chong, Jr. | |
| 2006/0230208 A1 * | 10/2006 | Gregg et al. | 710/260 |
| 2006/0230209 A1 * | 10/2006 | Gregg et al. | 710/263 |
| 2007/0208820 A1 * | 9/2007 | Makhervaks et al. | 709/212 |

OTHER PUBLICATIONS

SCSI, [online]; [retrieved on Jul. 21, 2006]; retrieved from the Internet <http://en.wikipedia.org/wiki/Scsi, 9 pages.
Switching Rules, [online]; [retrieved on Jul. 24, 2006]; retrieved from the Internet http://www.iw.com/magazine.php?inc=060101/06.01.01internettech2.html, 8 pages.
Remote Direct Memory Access, [online]; [retrieved on Jul. 21, 2006]; retrieved from the Internet http://en.wikipedia.org/wiki/Rdma, 1 page.

* cited by examiner

*Primary Examiner* — Aaron Strange
(74) *Attorney, Agent, or Firm* — Cantor Colburn LLP; Steven Chiu

(57) ABSTRACT

Systems, methods and computer program products for automatically triggering operations on a queue pair (QP). Methods include receiving a command at a remote direct memory access (RDMA) capable adapter. A trigger event element associated with the command is determined. The trigger event element is posted on a triggered QP. A triggeror element on a triggeror QP is posted, where the triggeror QP includes a reference to the triggered QP. A notification that the triggeror element has completed is received. The trigger event element is automatically initiated in response to receiving the notification.

18 Claims, 9 Drawing Sheets

SYSTEMS, METHODS AND COMPUTER PROGRAM PRODUCTS FOR AUTOMATICALLY TRIGGERING OPERATIONS ON A QUEUE PAIR

BACKGROUND OF THE INVENTION

The present invention relates generally to computer systems, and, in particular, to systems, methods, and computer program products for automatically triggering operations on a queue pair.

I/O adapters, such as remote direct memory access (RDMA)-capable adapters, define queue pairs (QPs) for conveying messaging information from a software consumer to the adapter prior to transmission over a network fabric. Industry standards, such as the InfiniBand™ Architecture Specification available from the InfiniBand® Trade Association and iWarp from the RDMA Consortium, specify that the message information carried on QPs is in the form of a work queue element (WQE) that carries control information pertaining to the message. Also, one or more data descriptors point to the message data to be transmitted or the location at which received messages are to be placed.

Some QP applications have a need to reduce the latency incurred dining data transfer operations. QP applications can involve a series of transactions, where one operation leads to a cascade of operations across multiple QPs. Delays are typically associated with software processing the completion of one operation in order to initiate a dependent operation. There is a need for a mechanism to enhance the standard QP semantics so that the lower latencies required by these applications can be achieved with minimal software intervention.

BRIEF SUMMARY OF THE INVENTION

Embodiments include a method for automatically triggering operations on a queue pair (QP). The method includes receiving a command at a remote direct memory access (RDMA) capable adapter. A trigger event element associated with the command is determined. The trigger event element is posted on a triggered QP. A triggeror element on a triggeror QP is posted, where the triggeror QP includes a reference to the triggered QP. A notification that the triggeror element has completed is received. The trigger event element is automatically initiated in response to receiving the notification.

Further embodiments include a system for supporting automatically triggering operations on a QP. The system includes a RDMA capable adapter, a triggered QP, a triggeror QP including a reference to the triggered QP, and logic. The logic facilitates receiving a command at the RDMA and determining a trigger event element associated with the command. The trigger event element is posted on the triggered QP. A triggeror element is posted on the triggeror QP. A notification that the triggeror element has completed is received. The trigger event element is automatically initiated in response to receiving the notification.

Still further embodiments include a computer program product for supporting automatically triggering operations on a QP. The computer program product includes a storage medium readable by a processing circuit and storing instructions for execution by the processing circuit for facilitating a method. The method includes receiving a command at a remote direct memory access (RDMA) capable adapter. A trigger event element associated with the command is determined. The trigger event element is posted on a triggered QP. A triggeror element on a triggeror QP is posted, where the triggeror QP includes a reference to the triggered QP. A notification that the triggeror element has completed is received. The trigger event element is automatically initiated in response to receiving the notification.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Referring now to the drawings wherein like elements are numbered alike in the several FIGURES.

DETAILED DESCRIPTION OF EXEMPLARY EMBODIMENTS

Figure 6:
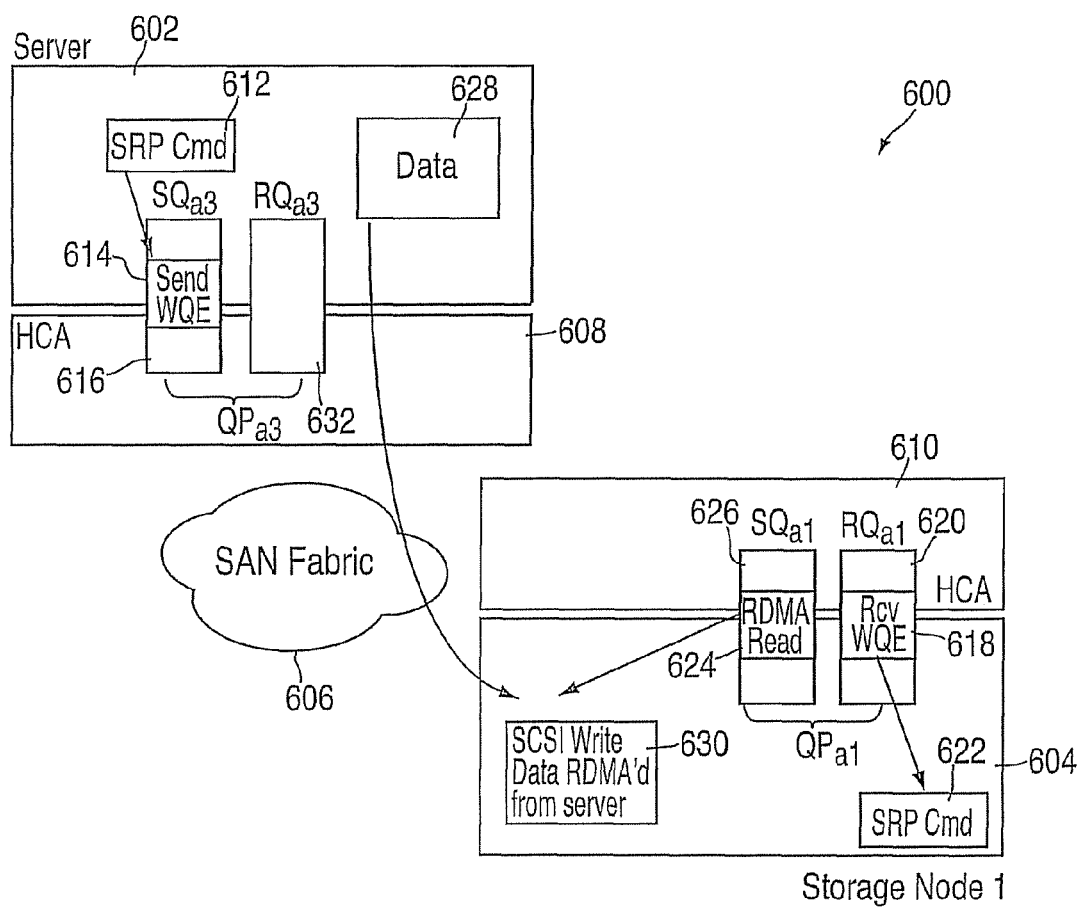
FIG. 6 is a diagram illustrating a portion of a distributed computer system used to perform a write operation from a server to a storage node through non-triggered queue pairs that is part of an exemplary operating environment for embodiments of the present invention.
Figure 7:
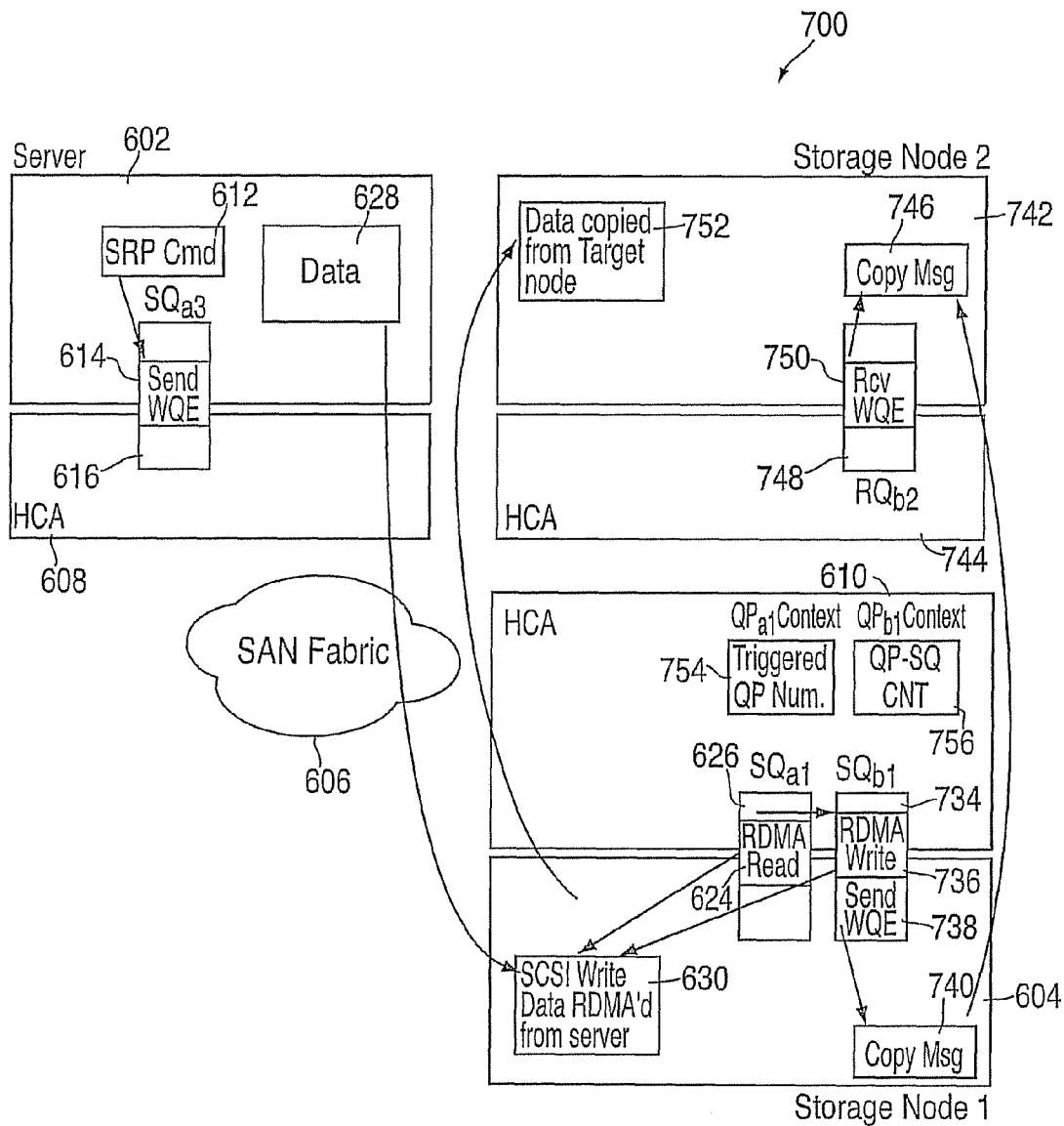
FIG. 7 is a diagram illustrating a portion of a distributed computer system used to perform a write operation from a server to a storage node and copy write data between storage nodes through triggered queue pairs in exemplary embodiments of the present invention.
Figure 8:
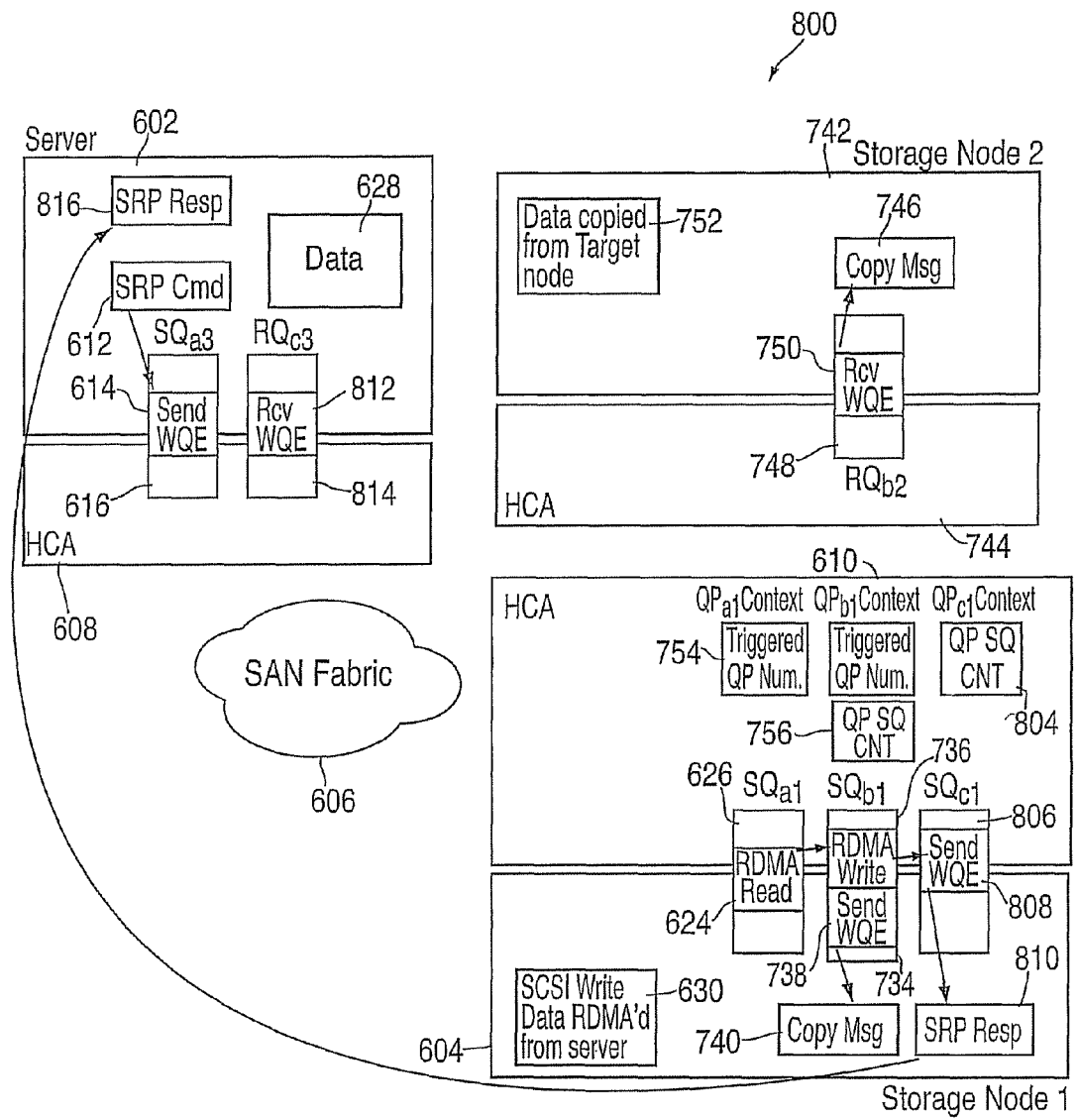
FIG. 8 is a diagram illustrating a portion of a distributed computer system used to perform a write operation from a server to a storage node, copy write data between storage nodes, and send a response back to the server through triggered queue pairs in exemplary embodiments of the present invention.
Figure 9:
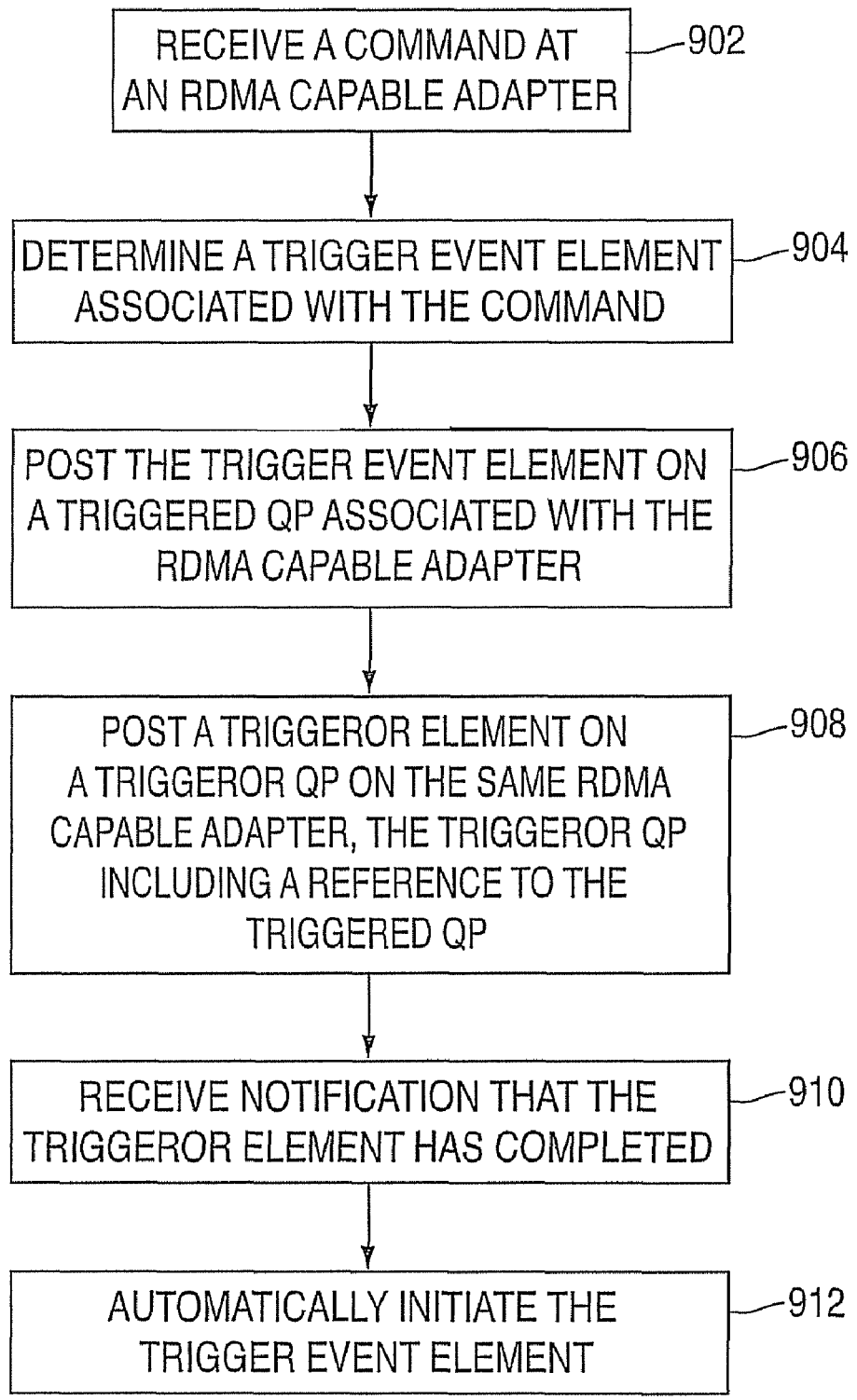
FIG. 9 illustrates one example of a flow diagram describing a process for automatically triggering operations on a queue pair that may be implemented by exemplary embodiments.

Exemplary embodiments of the present invention provide a cascade of operations on queue pairs (QPs) through configurable triggering; thereby removing the latency associated with software processing of completion and initiation of dependent operations on other QPs on remote data memory access (RDMA)-capable adapters. RDMA capable adapters may be RDMA channel adapters, such as those defined by the InfiniBand™ Architecture Specification, or RDMA network interface cards (RNICs), such as those defined by iWarp from the RDMA Consortium. Although reference is made to RDMA capable adapters, it will be understood by those skilled in the art that triggered QPs need not be limited to operations that use RDMA, as systems that include RDMA capable adapters may support multiple methods for transferring data through QPs. Exemplary embodiments may be implemented in a distributed computing system, such as a system area network (SAN) having end nodes, switches, routers, and links interconnecting these components. FIGS. 1-5 show various parts of an exemplary operating environment for embodiments of the present invention. FIG. 6 shows an example small computer system interface (SCSI) write operation in an exemplary operating environment. FIG. 7 shows an example SCSI write operation with a backup copy operation using triggered queue pairs in an exemplary operating environment for embodiments of the present invention. FIG. 8 shows an example SCSI write operation with a backup copy operation and response using triggered queue pairs in an exemplary operating environment for embodiments of the present invention. FIG. 9 depicts a process of using triggered queue pairs for exemplary embodiments of the present invention.

Figure 1:
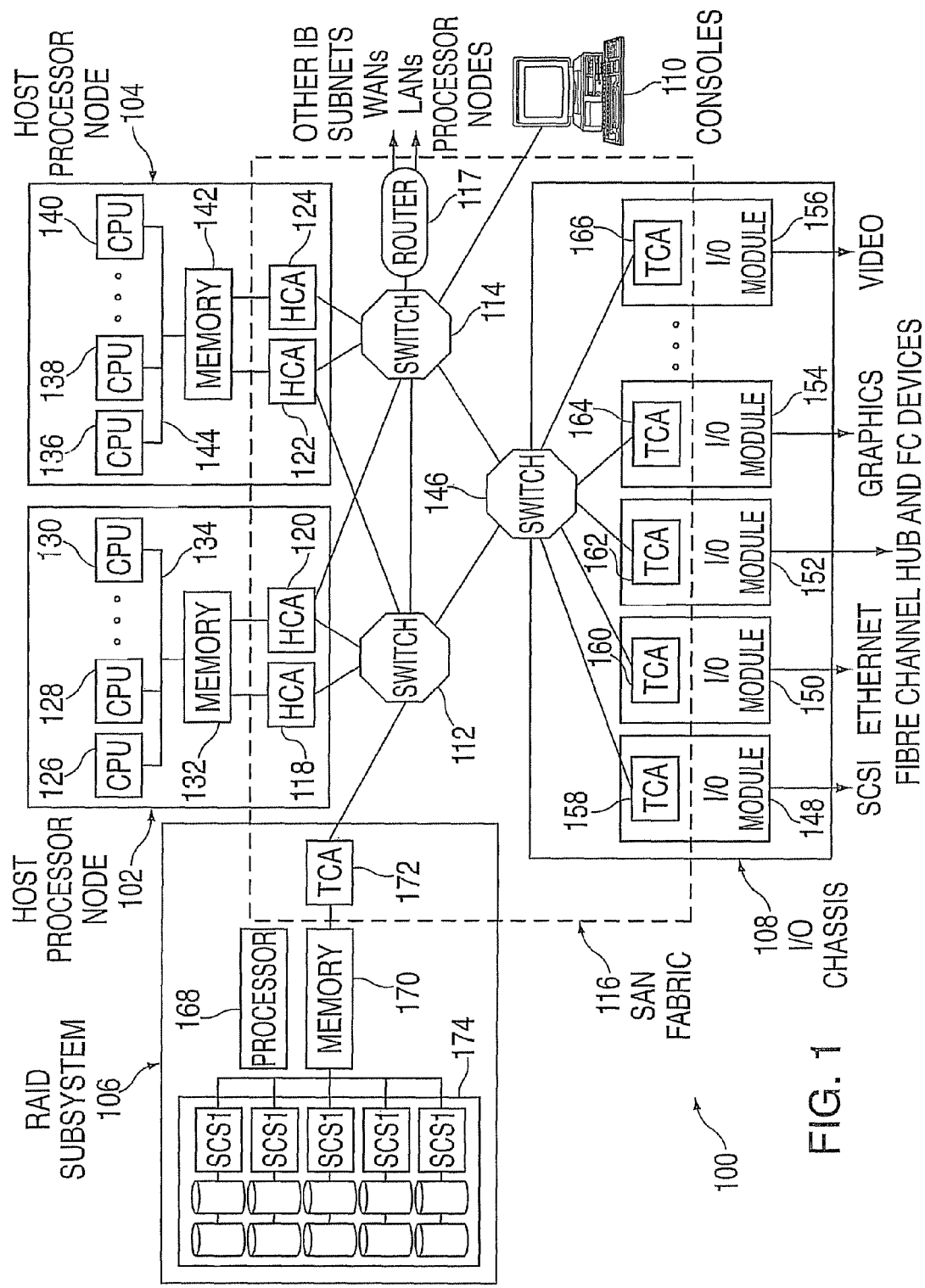
FIG. 1 is a diagram of a distributed computer system that is an exemplary operating environment for embodiments of the present invention.

FIG. 1 is a diagram of a distributed computer system where exemplary embodiments may be implemented. The distributed computer system represented in FIG. 1 takes the form of a SAN 100 and is provided merely for illustrative purposes. Exemplary embodiments of the present invention described below can be implemented on computer systems of numerous other types and configurations. For example, computer systems implementing the exemplary embodiments can range from a small server with one processor and a few input/output (I/O) adapters to massively parallel supercomputer systems with hundreds or thousands of processors and thousands of I/O adapters.

Referring to FIG. 1, a SAN 100 is a high-bandwidth, low-latency network for interconnecting nodes within a distributed computer system. A node is any component attached to one or more links of a network and forming the origin and/or destination of messages within the network. In the example depicted in FIG. 1, the SAN 100 includes nodes in the form of host processor node 102, host processor node 104, redundant array independent disk (RAID) subsystem node 106, and I/O chassis node 108. The nodes illustrated in FIG. 1 are for illustrative purposes only, as SAN 100 can interconnect any number and any type of independent processor nodes, I/O adapter nodes, and I/O device nodes. Any one of the nodes can function as an end node, which is herein defined to be a device that originates or finally consumes messages or packets in SAN 100.

In exemplary embodiments, an error handling mechanism in distributed computer systems is present in which the error handling mechanism allows for reliable connection and/or reliable datagram communication between end nodes in distributed computing systems, such as SAN 100.

A message, as used herein, is an application-defined unit of data exchange, which is a primitive unit of communication between cooperating processes. A packet is one unit of data encapsulated by networking protocol headers and/or trailers. The headers generally provide control and routing information for directing the packet through SAN 100. The trailer generally contains control and cyclic redundancy check (CRC) data to verify that packets are not delivered with corrupted contents.

The SAN 100 depicted in FIG. 1 contains the communications and management infrastructure supporting both I/O and interprocessor communications (IPC) within a distributed computer system. The SAN 100 shown in FIG. 1 includes a switched communications fabric 116, which allows many devices to concurrently transfer data with high-bandwidth and low-latency in a secure, remotely managed environment.

End nodes can communicate over multiple ports and utilize multiple paths through the SAN fabric. The multiple ports and paths through the SAN shown in FIG. 1 can be employed for fault tolerance and increased bandwidth data transfers.

The SAN 100 in FIG. 1 includes three switches 112, 114, and 146, and router 117. A switch is a device that connects multiple links together and allows routing of packets from one link to another link within a subnet using a small header destination local identifier (DLID) field. A router is a device that connects multiple subnets together and is capable of routing packets from one link in a first subnet to another link in a second subnet using a large header destination globally unique identifier (DGUID).

In one embodiment, a link is a full duplex channel between any two network fabric elements, such as end nodes, switches, or routers. Example suitable links include, but are not limited to, copper cables, optical cables, and printed circuit copper traces on backplanes and printed circuit boards.

For reliable service types, end nodes, such as host processor end nodes and I/O adapter end nodes, generate request packets and return acknowledgment packets. Switches and routers pass packets along, from the source to the destination. Except for the variant CRC trailer field, which is updated at each stage in the network, switches pass the packets along unmodified. Routers update the variant CRC trailer field and modify other fields in the header as the packet is routed.

In SAN 100 as illustrated in FIG. 1, host processor node 102, host processor node 104, and I/O chassis 108 include at least one RDMA-capable channel adapter (CA) to interface to SAN 100. In exemplary embodiments, each CA is an endpoint that implements the CA interface in sufficient detail to source or sink packets transmitted on SAN fabric 116. Host processor node 102 contains CAs in the form of RDMA capable host channel adapters (HCAs) 118 and 120. Host processor node 104 contains HCAs 122 and 124. Host processor node 102 also includes central processing units 126-130 and a memory 132 interconnected by bus system 134. Host processor node 104 similarly includes central processing units 136-140 and a memory 142 interconnected by a bus system 144. HCAs 118 and 120 provide a connection from host processor node 102 to switch 112; while HCAs 122 and 124 provide a connection from host processor node 104 to switches 112 and 114.

In exemplary embodiments, an HCA is implemented in hardware. In this implementation, the HCA hardware offloads much of the central processing unit I/O adapter communication overhead. This hardware implementation of the HCA also permits multiple concurrent communications over a switched network without the traditional overhead associated with communication protocols. In one embodiment, the HCAs and SAN 100 in FIG. 1 provide the I/O and IPC consumers of the distributed computer system with zero processor-copy data transfers without involving the operating system kernel process, and employs hardware to provide reliable, fault tolerant communications.

As indicated in FIG. 1, router 117 is coupled to wide area network (WAN) and/or local area network (LAN) connections to other hosts or other routers. The I/O chassis 108 in FIG. 1 includes an I/O switch 146 and multiple I/O modules 148-156. In these examples, the I/O modules 148-156 take the form of adapter cards. Example adapter cards illustrated in FIG. 1 include a SCSI adapter card for I/O module 148; an adapter card to fibre channel hub and fibre channel arbitrated loop (FC-AL) devices for I/O module 152; an Ethernet adapter card for I/O module 150; a graphics adapter card for I/O module 154; and a video adapter card for I/O module 156. Any known type of adapter card can be implemented. I/O adapters also include a switch in the I/O adapter to couple the adapter cards to the SAN fabric. These modules contain RDMA capable target channel adapters (TCAs) 158-166.

In the example depicted in FIG. 1, the RAID subsystem node 106 includes a processor 168, a memory 170, a TCA 172, and multiple redundant and/or striped storage disk units 174. TCA 172 can be a fully functional HCA.

SAN 100 handles data communications for I/O and interprocessor communications. SAN 100 supports high-bandwidth and scalability required for I/O and also supports the extremely low latency and low CPU overhead required for interprocessor communications. User clients can bypass the operating system kernel process and directly access network communication hardware, such as HCAs, which enable efficient message passing protocols. SAN 100 is suited to current computing models and is a building block for new forms of I/O and computer cluster communication. Further, SAN 100 in FIG. 1 allows I/O adapter nodes to communicate with each other or to communicate with any of the processor nodes in distributed computer systems. With an I/O adapter attached to the SAN 100 the resulting I/O adapter node has substantially the same communication capability as any host processor node in SAN 100.

In exemplary embodiments, the SAN 100 shown in FIG. 1 supports channel semantics and memory semantics. Channel semantics is sometimes referred to as send/receive or push communication operations. Channel semantics are the type of communications employed in a traditional I/O channel where a source device pushes data and a destination device determines a final destination of the data. In channel semantics, the packet transmitted from a source process specifies a destination processes' communication port, but does not specify where in the destination processes' memory space the packet will be written. Thus, in channel semantics, the destination process pre-allocates allocates where to place the transmitted data.

In memory semantics, a source process directly reads or writes the virtual address space of a remote node destination process. The remote destination process need only communicate the location of a buffer for data, and does not need to be involved in the transfer of any data. Thus, in memory semantics, a source process sends a data packet containing the destination buffer memory address of the destination process. In memory semantics, the destination process previously grants permission for the source process to access its memory.

Channel semantics and memory semantics are typically both utilized for I/O and interprocessor communications. A typical I/O operation employs a combination of channel and memory semantics. In an illustrative example I/O operation of the distributed computer system shown in FIG. 1, a host processor node, such as host processor node 102, initiates an I/O operation by using channel semantics to send a disk write command to a disk I/O adapter, such as RAID subsystem TCA 172. The disk I/O adapter examines the command and uses memory semantics to read the data buffer directly from the memory space of the host processor node. After the data buffer is read, the disk I/O adapter employs channel semantics to push an I/O completion message back to the host processor node.

In exemplary embodiments, the distributed computer system shown in FIG. 1 performs operations that employ virtual addresses and virtual memory protection mechanisms to ensure correct and proper access to all memory. Applications running in such a distributed computer system are not required to use physical addressing for any operations.

Figure 2:
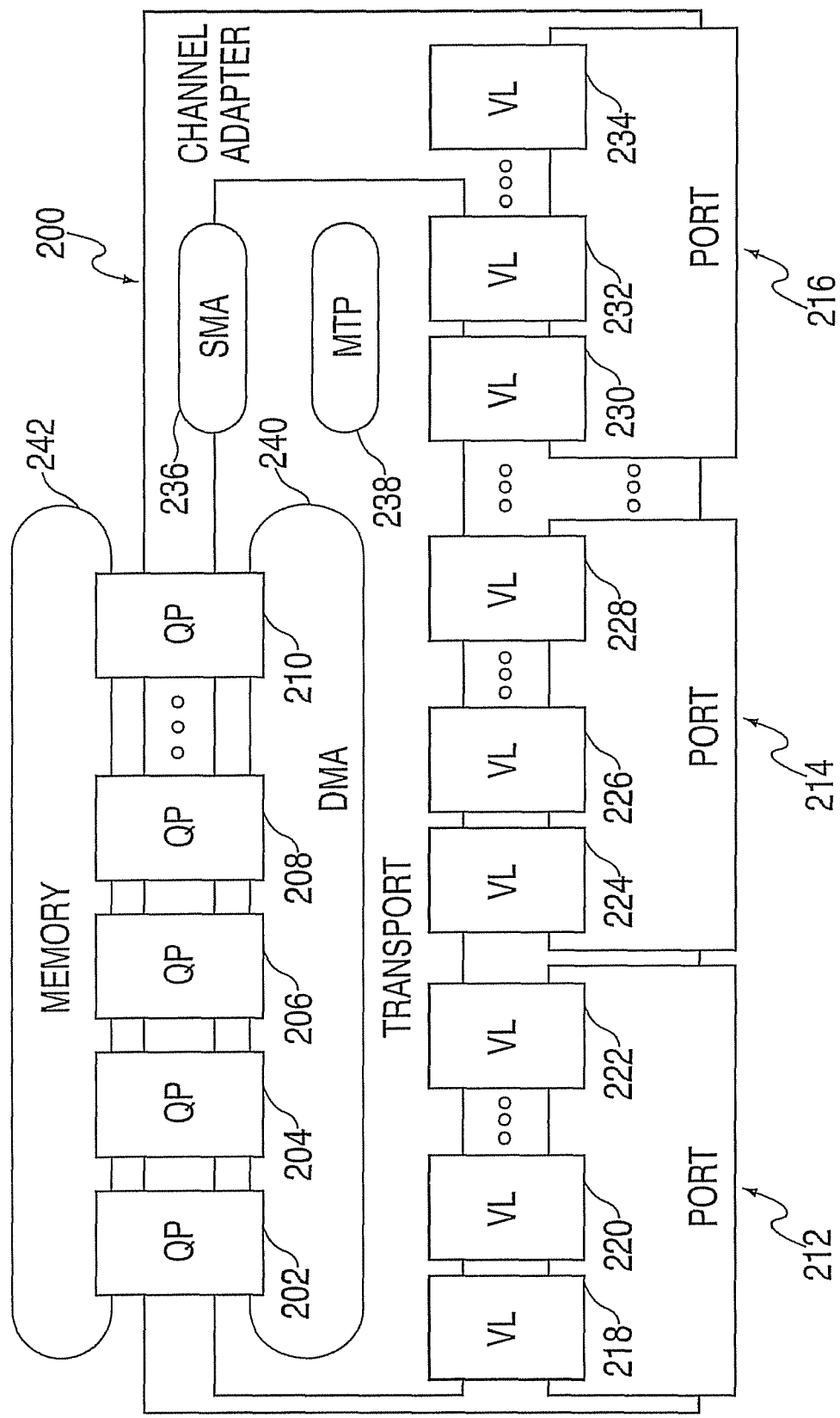
FIG. 2 is a diagram of a host channel adapter that is part of an exemplary operating environment for embodiments of the present invention.

With reference now to FIG. 2, a diagram of an HCA 200 is depicted. HCA 200 shown in FIG. 2 includes a set of QPs 202-210, which is used to transfer messages to the HCA ports 212-216. Buffering of data to HCA ports 212-216 is channeled through virtual lanes (VL) 218-234 where each VL has its own flow control. Subnet manager configures the channel adapter with the local addresses for each physical port, i.e., the port's local identifier (LID). Subnet manager agent (SMA) 236 is the entity that communicates with the subnet manager for the purpose of configuring the channel adapter. Memory translation and protection (MTP) 238 is a mechanism that translates virtual addresses to physical addresses and validates access rights. Direct memory access (DMA) 240 provides for DMA operations using memory 242 with respect to QPs 202-210.

A single channel adapter, such as the HCA 200 shown in FIG. 2, can support thousands of QPs. By contrast, a TCA in an I/O adapter typically supports a much smaller number of QPs. Each QP consists of two work queues, a send queue (SQ) and a receive queue (RQ). The SQ is used to send channel and memory semantic messages. The RQ receives channel semantic messages. A consumer calls an operating system specific programming interface, which is herein referred to as a "verbs interface", to place work requests (WRs) onto a work queue.

Figure 3:
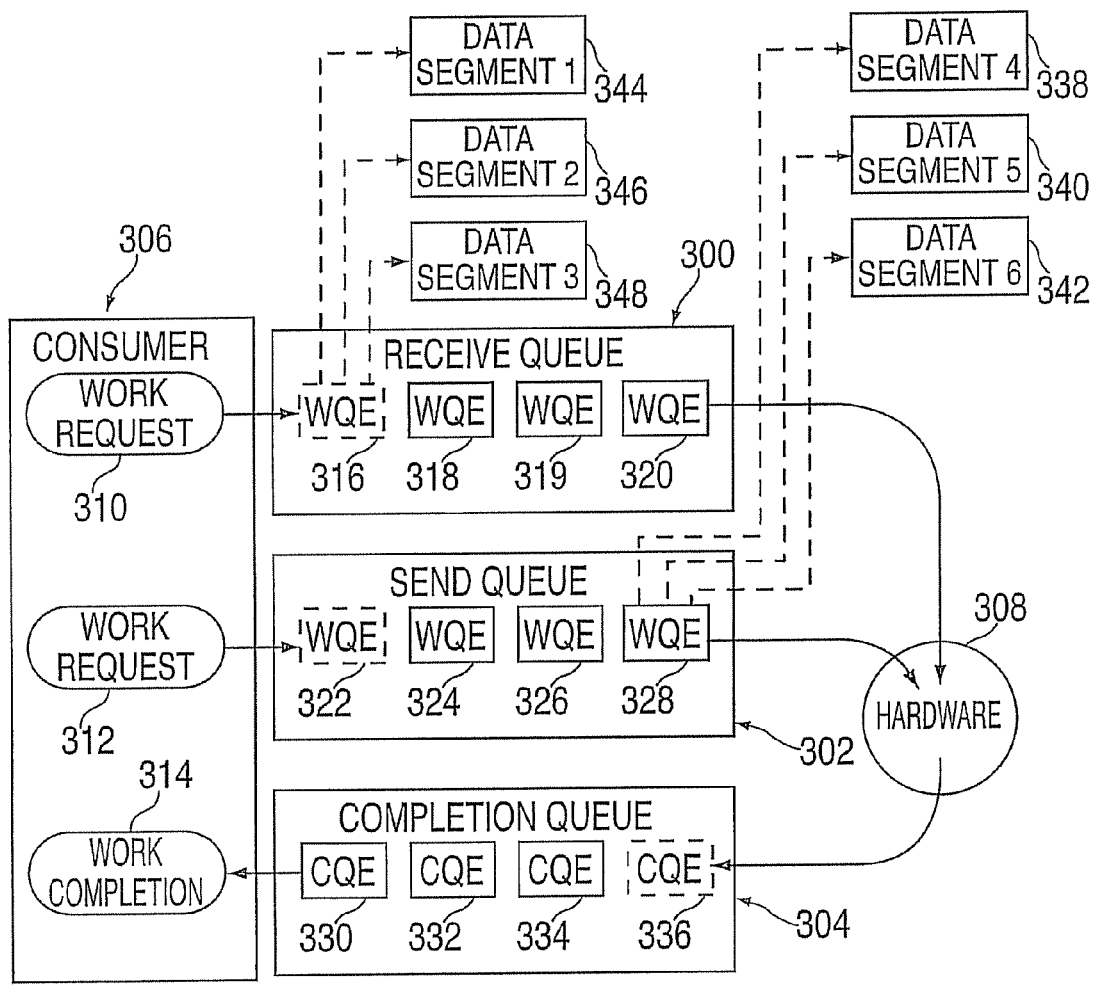
FIG. 3 is a diagram illustrating processing of work requests that is part of an exemplary operating environment for embodiments of the present invention.

With reference now to FIG. 3, a diagram illustrating processing of work requests is depicted. In FIG. 3, RQ 300, SQ 302, and completion queue (CQ) 304 are present for processing requests from and for consumer 306. These requests from consumer 306 are eventually sent to hardware 308. In this example, consumer 306 generates work requests 310 and 312 and receives work completion 314. As shown in FIG. 3, work requests placed onto a work queue are referred to as work queue elements (WQEs).

SQ 302 contains WQEs 322-328, describing data to be transmitted on the SAN fabric. RQ 300 contains WQEs 316-320, describing where to place incoming channel semantic data from the SAN fabric. A WQE is processed by hardware 308 in the HCA. Each QP is managed through a QP context, which is a block of information that pertains to a particular QP, such as the current WQEs, Packet Sequence Numbers, transmission parameters, etc.

The verbs interface also provides a mechanism for retrieving completed work from CQ 304. As shown in FIG. 3, CQ 304 contains completion queue elements (CQEs) 330-336. CQEs contain information about previously completed WQEs. CQ 304 is used to create a single point of completion notification for multiple QPs. A CQE is a data structure on a CQ that describes a completed WQE. The CQE contains sufficient information to determine the QP and specific WQE that completed. A CQ context is a block of information that contains pointers to, length, and other information needed to manage the individual CQs.

Example WRs supported for the SQ 302 shown in FIG. 3 are as follows. A send WR is a channel semantic operation to push a set of local data segments to the data segments referenced by a remote node's receive WQE. For example, WQE 328 contains references to data segment 4 338, data segment 5 340, and data segment 6 342. Each of the send WR's data segments contains a virtually contiguous memory space. The virtual addresses used to reference the local data segments are in the address context of the process that created the local QP.

In exemplary embodiments, RQ 300 shown in FIG. 3 only supports one type of WQE, which is referred to as a receive WQE. The receive WQE provides a channel semantic operation describing a local memory space into which incoming send messages are written. The receive WQE includes a scatter list describing several virtually contiguous memory spaces. An incoming send message is written to these memory spaces. The virtual addresses are in the address context of the process that created the local QP.

For interprocessor communications, a user-mode software process transfers data through QPs directly from where the buffer resides in memory. In exemplary embodiments, the transfer through the QPs bypasses the operating system and consumes few host instruction cycles. QPs permit zero processor-copy data transfer with no operating system kernel involvement. The zero process-copy data transfer provides for efficient support of high-bandwidth and low-latency communication.

When a QP is created, the QP is set to provide a selected type of transport service. In exemplary embodiments, a distributed computer system implementing the present invention supports four types of transport services: reliable connection, unreliable connection, reliable datagram, and unreliable datagram service.

Figure 4:
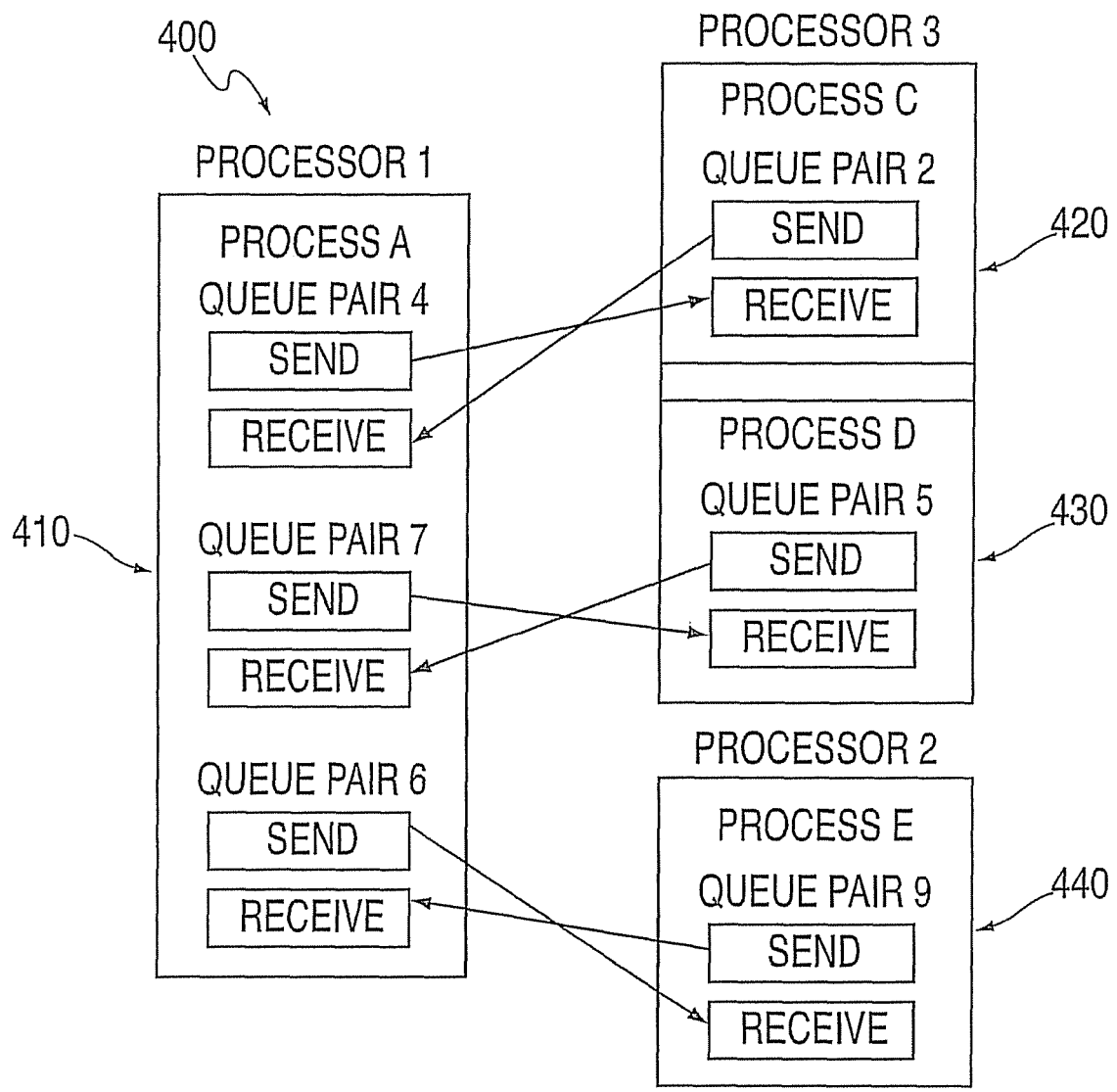
FIG. 4 is a diagram illustrating a portion of a distributed computer system in which a reliable connection service is used that is part of an exemplary operating environment for embodiments of the present invention.

A portion of a distributed computer system employing a reliable connection service to communicate between distributed processes is illustrated generally in FIG. 4. The distributed computer system 400 in FIG. 4 includes a host processor node 1, a host processor node 2, and a host processor node 3. Host processor node 1 includes a process A 410. Host processor node 3 includes a process C 420 and a process D 430. Host processor node 2 includes a process E 440.

Host processor node 1 includes QPs 4, 6, and 7, each having an SQ and RQ. Host processor node 2 has a QP 9 and host processor node 3 has QPs 2 and 5. The reliable connection service of distributed computer system 400 associates a local QP with one and only one remote QP through configuring the local QP context to identify the remote QP by a port and a QP number. Thus, the QP 4 is used to communicate with QP 2; QP 7 is used to communicate with QP 5; and QP 6 is used to communicate with QP 9.

A WQE placed on one QP in a reliable connection service causes data to be written into the receive memory space referenced by a receive WQE of the connected QP. RDMA operations operate on the address space of the connected QP.

In exemplary embodiments, the reliable connection service is made reliable because hardware maintains sequence numbers and acknowledges all packet transfers. A combination of hardware and SAN driver software retries any failed communications. The process client of the QP obtains reliable communications even in the presence of bit errors, receive under runs, and network congestion. If alternative paths exist in the SAN fabric, reliable communications can be maintained even in the presence of failures of fabric switches, links, or channel adapter ports.

In addition, acknowledgements may be employed to deliver data reliably across the SAN fabric. The acknowledgment may, or may not, be a process level acknowledgment, i.e. an acknowledgment that validates that a receiving process has consumed the data. Alternatively, the acknowledgment may be one that only indicates that the data has reached its destination.

Figure 5:
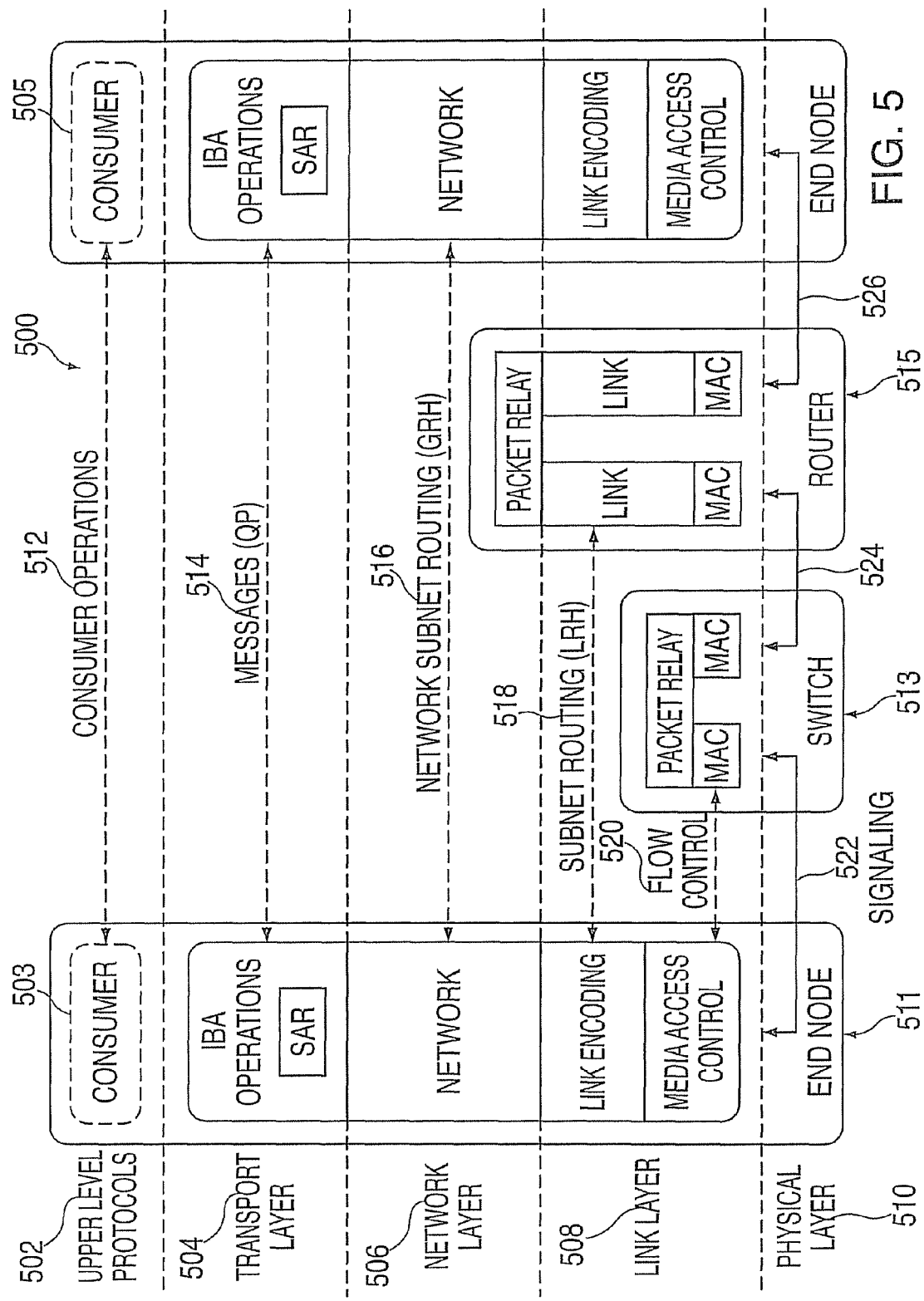
FIG. 5 is a diagram of a layered communication architecture that is part of an exemplary operating environment for embodiments of the present invention.

An example of a layered communication architecture 500 for implementing exemplary embodiments is generally illustrated in FIG. 5. The layered architecture diagram of FIG. 5 shows the various layers of data communication paths and organization of data and control information passed between layers.

HCA end node protocol layers (employed by end node 511, for instance) include upper level protocol 502 defined by consumer 503, a transport layer 504, a network layer 506, a link layer 508, and a physical layer 510. Switch layers (employed by switch 513, for instance) include link layer 508 and physical layer 510. Router layers (employed by router 515, for instance) include network layer 506, link layer 508, and physical layer 510.

The layered architecture 500 depicted in FIG. 5 generally follows an outline of a classical communication stack. With respect to the protocol layers of end node 511, for example, upper layer protocol 502 employs the verbs interface to create messages at transport layer 504. Network layer 506 routes packets between network subnets 516. Link layer 508 routes packets within a network subnet 518. Physical layer 510 sends bits or groups of bits to the physical layers of other devices. Each of the layers is unaware of how the upper or lower layers perform their functionality.

Consumers 503 and 505 represent applications or processes that employ the other layers for communicating between end nodes. Transport layer 504 provides end-to-end message movement. In exemplary embodiments, the transport layer provides four types of transport services as described above which are reliable connection service; reliable datagram service; unreliable datagram service; and unreliable connection service. Network layer 506 performs packet routing through a subnet or multiple subnets to destination end nodes. Link layer 508 performs flow-controlled, error checked, and prioritized packet delivery across links.

Physical layer 510 performs technology-dependent bit transmission. Bits or groups of bits are passed between physical layers via links 522, 524, and 526. Links can be implemented with printed circuit copper traces, copper cable, optical cable, or with other suitable links.

FIG. 6 depicts an exemplary embodiment of a SAN 600 that includes a server 602 with HCA 608 communicably coupled through SAN fabric 606 to a storage node 1 604 with HCA 610. This example illustrates a SCSI write operation using a protocol such as SCSI RDMA protocol (SRP) or Internet SCSI (iSCSI) enabled for RDMA (iSER) over an RDMA-capable network through HCAs 608 and 610. To initiate the exemplary SCSI write operation, a SCSI command descriptor block (CDB) is transferred from server 602 to storage node 1 604 using SRP command 612 that is sent using standard QP send/receive mechanisms. QPa3 on server 602 consists of SQa3 616 and RQa3 632. QPa1 on storage node 1 604 consists of SQa1 626 and RQa1 620. A send WQE 614 is posted to SQa3 616 to initiate the transfer of SRP command 612. HCA 610 consumes receive WQE 618 from RQa1 620, placing SRP command 622 into storage node 1 604 memory. When storage node 1 604 software decodes the SCSI CDB and determines that a SCSI write has been requested, it posts an RDMA read WQE 624 to SQa1 626 to fetch the SCSI write data 628 from server 602. HCA 608 fetches data 628 on server 602 and sends it via SAN fabric 606 to HCA 610. HCA 610 transfers this data to location 630 on storage node 1 604. In this example, no receive WQE is required for the RDMA read on server 602, thus no receive WQE is depicted in RQa3 632.

When a SCSI write operation is performed on a high-end storage controller, additional steps may be required to maintain data integrity and reliability, such as storing a redundant copy of data to protect against a failure in the storage node causing the loss of data before it is stored on a disk device. Additional steps in a sequence of operations using QPs can add latency as software services CQEs from an associated CQ. The latency can be reduced through the use of exemplary embodiments that utilize notification of the completion of one operation, a triggeror element in a triggeror QP, to initiate or trigger another operation sequence of trigger event elements in a triggered QP. The sequence of triggeror elements in the triggeror QP and the trigger event elements in the triggered QP may be determined based upon a particular command, such as a SCSI write command, received by the RDMA capable adapter. Exemplary embodiments further extend this process to link multiple QPs such that multiple sequences of WQEs can be performed in hardware, such as an HCA, without software intervention during the sequence. A QP that triggers another QP may be referred to a "triggeror QP". A QP that is triggered by another QP may be referred to as a "triggered QP". It is possible for the same QP to be both a triggeror QP and a triggered QP when the QP is part of a chain or cascade of triggered QPs. In exemplary embodiments, a single triggeror QP references a triggered QP. Additionally in exemplary embodiments, a triggered QP is not used for general-purpose non-triggered functions, nor is it triggered by software.

The usual approach to performing operations through QPs is to post WQEs in the order that they will be performed. However, when a triggered QP is used, WQEs that serve as trigger event elements must be pre-posted on the triggered QP prior to posting WQEs to the triggeror QP, such that dependent operations are posted before the sequence of operations leading to the trigger event is initiated. Each triggered QP may have multiple operations pre-posted.

The basic mechanisms to support triggered QPs include but are not limited to the following:

1. A register or storage element in the triggeror QP context that contains the QP identification number of the triggered QP, referred to herein as a "triggered QP number" register. The hardware checks that the triggered QP belongs to the same logical partition (LPAR) as the triggeror QP and that the triggered QP is in an appropriate state. An LPAR is the division of a computer's processors, memory, and storage into multiple sets of resources so that each set of resources can be operated independently with its own operating system instance and applications. In alternate exemplary embodiments, implemented in non-LPAR environments, the check performed in this step is not required.

2. A WQE triggeror element on the triggeror QP containing a field indicating the count of the number of WQEs to be processed on the triggered QP, said field referred to herein as a "triggered-doorbell" field. The triggered-doorbell field may be zero if no triggered operations are required.

3. A register or storage element in the triggered QP context that contains the count of the number of WQEs in the SQ to process when triggered, referred to herein as a "QP SQ count" register.

When a WQE that is a triggeror element in a triggeror QP completes, the QP identified by the triggered QP number register is accessed and the number in the WQE triggered-doorbell field is added to a QP SQ count register in the triggered QP context. The number of WQEs in the QP SQ count register is then executed by the HCA on the triggered QP.

FIG. 7 illustrates exemplary embodiments of a triggeror QP and a triggered QP utilized in a copy of SCSI write data operation. This example expands upon the SCSI write example depicted in FIG. 6 through generating a copy of the SCSI write data on a second storage node. SAN 700 is comprised of a server 602 with HCA 608, storage node 1 604 with HCA 610, and storage node 2 742 with HCA 744, all communicably coupled through SAN fabric 606. By using a triggered QP, the secondary operation of copying SCSI write data 630 received from server 602 in storage node 1 604 to storage node 2 742 is automatically initiated when RDMA read WQE 624 completes. For simplicity, only SQa1 626 of QPa1, SQb1 734 of QPb1, RQb2 748 of QPb2, and SQa3 616 of QPa3 are included in FIG. 7. QPa1 in storage node 1 604 is connected to QPa3 in server 602 through HCAs 608 and 610 communicably coupled to SAN fabric 606. QPb1 in storage node 1 604 is connected to QPb2 in storage node 2 742 through HCAs 610 and 744 communicably coupled to SAN fabric 606.

In the exemplary embodiment illustrated in FIG. 7, QPa1 and QPb1 must be configured to support trigger operations through their respective QP context control registers. Triggered QP number register 754 in QPa1 context is loaded with a QP identification number associated with QPb1. This establishes the triggering relationship between SQa1 626 and SQb1 734, with SQa1 626 referencing SQb1 734. As in the FIG. 6 example, once send WQE 614 delivers SRP command 612 to storage node 1 604, the process of a SCSI write operation is initiated on storage node 1 604. In the FIG. 7 example, storage node 1 604 takes an additional step of copying SCSI write data 630 to storage node 2 742. To perform the copy to storage node 2 742 without software intervention during the sequence, storage node 1 can use trigger event elements on triggered queue pairs to automate the SCSI write and copy sequence.

Continuing with the example in FIG. 7, storage node 1 604 posts on SQb1 734 all RDMA write WQEs 736 trigger event elements necessary to complete the copy of SCSI write data 630 to storage node 2 742. A send WQE 738 may also be posted on SQb1 734 to inform storage node 2 742 that a copy has been completed. Alternatively, an additional RDMA write WQE could be used to send the copy-complete message. The WQEs on SQb1 734 are not processed until triggered. Storage node 1 604 posts an RDMA read WQE 624 to SQa1 626 to fetch SCSI write data 630 from server 602. The RDMA read WQE 624 triggered-doorbell field provides the number of WQEs posted on triggered QP SQb1 734, as referenced through triggered QP number register 754. HCA 610 processes RDMA read WQE 624 on SQa1 626 and transfers data 628 to the storage node 1 target location 630. When RDMA read WQE 624 completes, HCA 610 reads the QP number (QPb1) stored in triggered QP number 754 register of QPa1 and updates QP send queue count 756 register with the number of WQEs, which is two in this example, to be processed on SQb1 734 based on the value of RDMA read WQE 624's triggered-doorbell field. RDMA read WQE 624 completion may, or may not generate a CQE, depending on whether a "request signaled completion" bit was set in the WQE. In exemplary embodiments, if RDMA read WQE 624 completes in error, QPa1 is placed in the error state, and QPb1 is not triggered. HCA 610 does not check the state of QPb1 when updating the QP SQ count register 756, and operations continue on QPa1 even if QPb1 is in the error state. As is known to those skilled in the art, error handling is not limited to the example given above as there are numerous options for performing error handling (e.g. HCA 610 could check the state of QPb1 and complete the RDMA Read WQE on QPa1 in error if QPb1 is not in the appropriate state, or a completion error could be generated on QPb1 if the RDMA Read WQE completes in error on QPa1). HCA 610 hardware processes RDMA write WQE 736 on SQb1 734 and transfers SCSI write data 630 to storage node 2 742 targeted location 752. HCA 610 hardware processes send WQE 738 on SQb1 734 and transfers copy message 740 to the storage node 2 742. Storage node 2 742 consumes receive WQE 750 from RQb2 748, placing copy message 746 into storage node 2 742 memory, informing storage node 2 742 that the copy has completed.

FIG. 8 illustrates a further extension of the example depicted in FIG. 7, whereby triggered QPs are cascaded together to automatically issue an SRP response 810 from storage node 1 604 to server 602, indicating that the SCSI write commanded through SRP command 612 has completed. If triggered QPs are not used to notify server 602 of the completion of the SCSI write operation, a typical procedure would be for storage node 1 604 software to post a send WQE on SQa1 626 after storage node 2 742 had completed the copy of SCSI data 752. This method entails additional software overhead, which can be avoided by applying the inventive principles of triggered QPs to cascade multiple operations. To facilitate the automated response by storage node 1 602, an additional triggered QP, QPc1, may be configured prior to initiating the command sequence on storage node 1 602. QPc1 is connected to an additional QP, QPc3, on server 602. To simplify FIG. 8, only SQc1 806 of QPc1 and RQc3 814 of QPc3 are shown. To link the triggered QP chain, SQb1 734 must be configured not only as a triggered QP but also as a triggeror QP. In addition to the configuration details provided with the FIG. 7 example, triggered QP number register 802 in QPb1 context is loaded with a QP identification number associated with QPc1. This establishes the triggering relationship between SQb1 734 and SQc1 806. Prior to posting RDMA write WQE 736 on SQb1 734, storage node 1 604 software may post a send WQE 808 on SQc1 806. Send WQE 808 points to SRP response 810, but since QPc1 is a triggered QP, send WQE 808 is not processed until SQc1 806 is triggered. To trigger SQc1 806, RDMA write WQE 736's triggered-doorbell field is loaded with a count of one. Once all WQEs are posted to SQb1 734 and SQc1 806, including send WQE 738, RDMA read WQE 624 is posted to SQa1 626 as previously described in the FIG. 7 example. When RDMA read WQE 624 completes on SQa1 626, RDMA write WQE 736 on SQb1 734 is triggered. RDMA read WQE 624 triggered-doorbell field is copied into a QP SQ count register 756 in the QPb1 context. The number of WQEs in the QP SQ count register 756 is then executed by HCA 610. When RDMA write WQE 736 completes, its triggered-doorbell field is copied into a QP SQ count register 804 in the QPc1 context. The number of WQEs in the QP SQ count register 804 is then executed by HCA 610. Send WQE 808 on SQc1 806 is processed and sends SRP response 810 to server 602. Server 602 consumes receive WQE 812 from RQc3 814, placing SRP response 816 into server 602 memory.

Turning now to FIG. 9, a process for automatically triggering operations on a QP will now be described in accordance with exemplary embodiments. At step 902, an RDMA capable adapter receives a command. At step 904, a trigger event element associated with the command is determined. At step 906, the trigger event element is posted on a triggered QP associated with the RDMA capable adapter. At step 908, a triggeror element is posted on a triggeror QP on the same RDMA capable adapter. The triggeror QP includes a reference to the triggered QP. At step 910, notification is received that the triggeror element has completed. At step 912, the trigger event element is automatically initiated.

Alternate exemplary embodiments include using triggered QPs for reliable connection or reliable datagram services. In further exemplary embodiments, an RDMA capable adapter may be an RNIC, instead of a TCA or an HCA, to support RDMA over an Ethernet link, using technology such as iWarp. An RNIC may extend a Transport Control Protocol/Internet Protocol (TCP/IP) stack with an RDMA protocol layer, enabling interactions with QPs in a similar fashion to an HCA.

Technical effects and benefits of exemplary embodiments include using triggered queue pairs to eliminate delays associated with software processing of the completion of an operation on a QP in order to initiate a dependent operation on another QP over RDMA capable adapters. Such a reduction in processing delays can increase overall system bandwidth and performance.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method for automatically triggering operations on a queue pair (QP), the method comprising:

receiving a command at a remote direct memory access (RDMA) capable adapter;

determining, by at least one processor, a trigger event element associated with the command, the trigger event element associated to the command by a configuration setting;

posting, by the at least one processor, the trigger event element on a triggered QP, the triggered QP managed by a triggered QP context, the triggered QP context containing a count of a number of trigger event elements to initiate;

posting, by the at least one processor, a triggeror element on a triggeror QP, the triggeror QP including a reference to the triggered QP;

receiving, by the at least one processor, notification that the triggeror element has completed; and automatically initiating, by the at least one processor, the trigger event element in response to receiving the notification;

wherein the posting of the trigger event element, the posting of the triggeror element the notification and the initiating are performed in hardware without software.

2. The method of claim 1, further comprising:
  initiating multiple trigger event elements in response to receiving the notification, the triggering performed entirely in hardware.

3. The method of claim 1, further comprising:
  linking multiple QPs such that a QP is both a triggered QP and a triggeror QP.

4. The method of claim 1, wherein the triggered QP and the triggeror QP belong to a common logical partition.

5. The method of claim 1, wherein the triggeror element contains a field indicating a number of trigger event elements to initiate in response to receiving the notification.

6. The method of claim 1, wherein the RDMA capable adapter is an RDMA channel adapter.

7. The method of claim 1, wherein the RDMA capable adapter is an RDMA network interface card.

8. A system for supporting automatically triggering operations on a queue pair (QP), the system comprising:
  a remote direct memory access (RDMA) capable adapter;
  a triggered QP;
  a triggered QP context for managing the QP, the triggered QP context containing a count of a number of trigger event elements to initiate;
  a triggeror QP including a reference to the triggered QP; and
  at least one processor for facilitating:
  receiving a command at the RDMA capable adapter;
    determining a trigger event element associated with the command, the trigger event element associated to the command by a configuration setting;
    posting the trigger event element on the triggered QP;
    posting a triggeror element on the triggeror QP;
    receiving notification that the triggeror element has completed; and
    automatically initiating the trigger event element in response to receiving the notification;
  wherein the posting of the trigger event element, the posting of the triggeror element the notification and the initiating are performed in hardware without software.

9. The system of claim 8,
  wherein the processor further facilitates initiating multiple trigger event elements in response to receiving the notification, the triggering performed entirely in hardware.

10. The system of claim 8, wherein the processor further facilitates linking multiple QPs such that a QP is both a triggered QP and a triggeror QP.

11. The system of claim 8, wherein the triggered QP and the triggeror QP belong to a common logical partition.

12. The system of claim 8, wherein the triggeror element contains a field indicating a number of trigger event elements to initiate in response to receiving the notification.

13. The system of claim 8, wherein the RDMA capable adapter is an RDMA channel adapter.

14. The system of claim 8, wherein the RDMA capable adapter is an RDMA network interface card.

15. A computer program product for supporting automatically triggering operations on a queue pair (QP), the computer program product comprising:
  a tangible storage medium readable by a processing circuit and storing instructions for execution by the processing circuit for facilitating a method comprising:
    receiving a command at a remote direct memory access (RDMA) capable adapter;
    determining a trigger event element associated with the command, the trigger event element associated to the command by a configuration setting;
    posting the trigger event element on a triggered QP, the triggered QP managed by a triggered QP context, the triggered QP context containing a count of a number of trigger event elements to initiate;
    posting a triggeror element on a triggeror QP, the triggeror QP including a reference to the triggered QP;
    receiving notification that the triggeror element has completed; and
    automatically initiating the trigger event element in response to receiving the notification;
    wherein the posting of the trigger event element, the posting of the triggeror element, the notification, and the initiating are performed in hardware without software.

16. The computer program product of claim 15 further comprising:
  initiating multiple trigger event elements in response to receiving the notification, the triggering performed entirely in hardware.

17. The computer program product of claim 15 further comprising:
  linking multiple QPs such that a QP is both a triggered QP and a triggeror QP.

18. The computer program product of claim 15, wherein the triggered QP and the triggeror QP belong to a common logical partition.

* * * * *